Feb. 19, 1963  W. BRYSON  3,077,913
ADJUSTABLE LOCKING SLEEVE FOR A NUT
Filed July 11, 1958

Inventor
*William Bryson*
By *L. S. Saulsbury*
Attorney

United States Patent Office 3,077,913
Patented Feb. 19, 1963

3,077,913
ADJUSTABLE LOCKING SLEEVE FOR A NUT
William Bryson, 15 Blackhurst Ave., off Yause Road,
Durban, Natal, Republic of South Africa
Filed July 11, 1958, Ser. No. 747,942
Claims priority, application Great Britain July 29, 1957
1 Claim. (Cl. 151—54)

This invention relates to a locking device for a threaded retaining means at least a portion of which is adapted to stand out from what is being retained thereby and has flat sides, for example a nut, bolt or the like.

It is an object of the invention to provide a device for locking a threaded retaining means as aforesaid against unwanted rotation which would cause the retaining means to loosen. The invention is particularly applicable to use in preventing loosening of the central retaining nut on a ship or aircraft propeller. It will be apparent that the invention is also readily applicable to locking the head of a bolt.

The invention is a locking device for a threaded retaining means at least a portion of which is adapted to stand out from what is being retained thereby and has flat sides, said device comprising a sleeve whereof the bore has flats adapted to fit closely round said portion and which has an external screw-thread of opposite sense to that of said retaining means, and a member having a socket tapped to receive said sleeve and having means for rigid attachment to a fixed base, the arrangement being such that with the base attachment means in alignment, the sleeve is rotatable to align the flats of its bore with the flats of the retaining means thereby enabling free passage of the locking device over the retaining means and ready attachment of the locking device to the fixed base.

Preferably, said base attachment means consists of a flange on said member apertured to receive bolts which screw into lapped holes in said fixed base.

Figure 1:
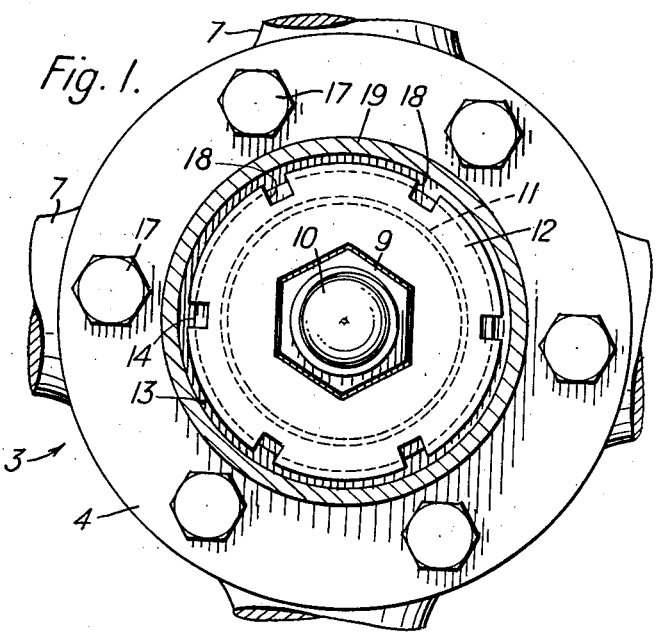
Figure 2:
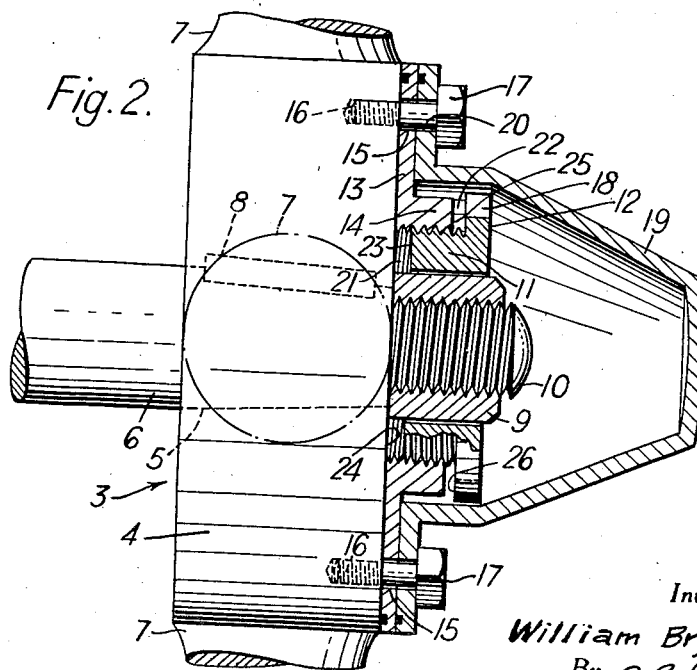

An embodiment of the invention will now be described, by way of example, with reference to the accompanying drawing, in which:

FIG. 1 is a front elevation of a ship's four-blade propeller mounted on a driving shaft with the central retaining nut locked by a locking device in accordance with the present invention, the dome of the dished cover shown in FIG. 2 being cut off for the purpose of better illustration; and FIG. 2 is a side elevation of the construction shown in FIG. 1, the retaining nut and locking device being shown in section for the purpose of better illustration.

Referring now to the drawing, the ship's propeller 3 comprises a hub 4 mounted on a tapered portion 5 near the end of the driving shaft 6. Four equi-spaced blades 7 extend radially from the hub which is prevented from rotating freely relative to the driving shaft by means of a key 8 and is secured on the shaft by means of a central hexagonal nut 9 screwed onto a threaded and reduced end portion 10 of the shaft. The shaft portion 10 and the nut 9 have left-hand threads.

The locking device which locks the retaining nut 9 in position on the shaft end 10 to prevent loosening of the nut comprises a sleeve 11 formed with a central aperture or bore of hexagonal shape, the flats being adapted to engage closely over the flats of the nut. The sleeve is also formed with an external right-hand screw thread, and with a circular flange 12 at its outer end. A circular disc-like member 13 is provided around the sleeve and is formed with a central thickened hub 14 which is tapped to receive the screw-threaded sleeve. The member 13 is also formed close to its periphery with a series of six through apertures 15 equi-spaced circumferentially to receive the shanks 16 of bolts 17 to be referred to hereinafter.

The flange 12 of the sleeve 11 is formed with an equi-spaced peripheral series of recesses 18 whereby it can be engaged by a suitable ring spanner for convenient clockwise or anti-clockwise adjustment when it is screwed into the hub 14 of the memeber 13 prior to the joint fitment into position of the sleeve 11 and member 13 which together form the locking device.

In use of the locking device, after the central hub-retaining nut 9 has been fully tightened, the inner sleeve 11 is screwed inwards until the face 26 abuts the face 25. The locking device is then aligned with the nut so that the through apertures 15 are axially aligned with the tapped openings in the hub. If then the flats of the sleeve bore are out of phase with the flats of the nut 9, a slight unscrewing of the sleeve 11 from the hub 14—about a tenth of a revolution at most—is sufficient to mate the hexagonal aperture in the sleeve with the central retaining nut 9. The unscrewing is effected by a suitable spanner as aforesaid although with small units finger adjustment would be possible. It will be noted that clearances 21 and 22 are left on the one hand between the free end face 23 of the sleeve and the face 24 of the propeller hub 4 and on the other hand between the end face 25 of the hub 14 and the adjacent face 26 of the flange 12. These clearances are shown enlarged for the purposes of illustration, it being understood that only a fraction of a revolution effects any necessary adjustment. The member 13 is then clamped by means of the six bolts 17 to the propeller hub 4. If the central retaining nut 9 tends to loosen by rotation, the sleeve screws into the hub 14 to the negligible extent permitted by the clearance. By this means any effective loosening of the nut is prevented.

Furthermore, if after some period of use the nut 9 requires to be re-faced by machining, the locking device can readily be removed for access to the nut and used again after replacement of the nut. By adjusting the sleeve relative to the number 13 compensation may be effected for consequent alteration in the angular disposition of the flats of the nut in the tightened position.

A dished cover 19 may be provided over the locking device as shown in FIG. 2. The cover 19 is made from sheet metal and is bolted in position by means of the aforementioned six bolts 17, the necessary through apertures 20 being provided for passage of the shanks 16 of the bolts. Sealing rings may be provided on the propeller hub 4, the disc-like member 13 and the cover 19 to prevent entry of foreign matter into the vicinity of the retaining nut 9.

The locking device comprising the sleeve 11 and disc-like member 13 can be used for purposes other than that illustrated and described. For example to lock six retaining nuts or bolts disposed in a circular arrangement such as are disposed the bolts 17 in FIG. 2, the member 13 would be replaced by a ring member having six suitably positioned and dimensioned openings tapped with left-hand threads each to receive a sleeve 11 having a bore shaped snugly to receive one of said nuts or the head of one of said bolts, formed with an external mating screw thread, and having a flange 12 with peripheral recesses 18 for adjustment purposes as hereinbefore described. Two set screws would suffice to secure the ring member in position.

I claim:

A nut locking device for a multi-sided nut having flats and having internal threads of one hand threaded on a corresponding stud immovably fixed to the threaded end of a shaft having a member secured thereto for rotation with said shaft, said locking device comprising a sleeve having a multi-sided central opening, defined by flat sides which engage closely over the flats of the nut, said sleeve having an external screw thread opposite to the thread of the nut and shaft, a circular radially outwardly extending flange secured to the outer end of said sleeve, a circular disc surrounding said sleeve, said disc having a central thickened hub tapped threadedly to engage the external thread of said sleeve, said disc having bolt holes thereabout for the reception of bolts securing said disc to the member on said shaft, said flange having peripheral recesses adapted for the reception of a tool to adjust said sleeve relative to said tapped hub to align the flat sides of the central opening therein with the flats of the nut, and a dished cover for said disc, sleeve, flange, nut, and threaded stud and secured to said disc by said bolts.

References Cited in the file of this patent

UNITED STATES PATENTS

| | | |
|---|---|---|
| 550,905 | Case | Dec. 3, 1895 |
| 741,747 | Walz | Oct. 20, 1903 |
| 1,003,513 | Rosset et al. | Sept. 19, 1911 |
| 1,643,034 | Sirl | Sept. 20, 1927 |
| 1,839,895 | Rossi | Jan. 5, 1932 |
| 2,390,838 | Johnson | Dec. 11, 1945 |
| 2,572,401 | Snow | Oct. 23, 1951 |